US006958982B2

United States Patent
Rudolf et al.

(10) Patent No.: US 6,958,982 B2
(45) Date of Patent: Oct. 25, 2005

(54) METHOD AND APPARATUS FOR STORING MOBILE STATION PHYSICAL MEASUREMENTS AND MAC PERFORMANCE STATISTICS IN A MANAGEMENT INFORMATION BASE OF AN ACCESS POINT

(75) Inventors: Marian Rudolf, Montreal (CA); Stephen G. Dick, Nesconset, NY (US); Teresa Joanne Hunkeler, Montreal (CA); Shamim Akbar Rahman, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/890,790

(22) Filed: Jul. 14, 2004

(65) Prior Publication Data

US 2005/0059422 A1 Mar. 17, 2005

Related U.S. Application Data

(60) Provisional application No. 60/487,653, filed on Jul. 16, 2003.

(51) Int. Cl.⁷ .............................................. H04Q 7/00
(52) U.S. Cl. .................... 370/328; 370/252; 370/318; 455/522
(58) Field of Search ................................ 370/328, 311, 370/310, 318, 329, 332, 333, 229, 338, 230, 235, 395.21, 465, 469, 236, 252, 253, 231; 455/522

(56) References Cited

U.S. PATENT DOCUMENTS

| | | | |
|---|---|---|---|
| 5,450,616 A | | 9/1995 | Rom |
| 2003/0003905 A1 | * | 1/2003 | Shvodian ..................... 455/423 |
| 2003/0093526 A1 | * | 5/2003 | Nandagopalan et al. .... 709/225 |
| 2003/0169774 A1 | * | 9/2003 | Del Prado Pavon et al. ......................... 370/503 |
| 2003/0214905 A1 | * | 11/2003 | Solomon et al. ............ 370/229 |
| 2004/0008690 A1 | * | 1/2004 | Kandala ................ 370/395.21 |
| 2004/0042435 A1 | * | 3/2004 | Soomro et al. ............. 370/338 |

* cited by examiner

*Primary Examiner*—Brian Nguyen
(74) *Attorney, Agent, or Firm*—Volpe and Koenig, P.C.

(57) ABSTRACT

A method and wireless communication system for requesting and obtaining transmit power control (TPC) information. The system includes at least one access point (AP) and at least one wireless transmit/receive unit (WTRU). When the AP decides to adapt the transmit power level of the WTRU, the AP transmits a TPC request frame to the WTRU. In response to receiving the TPC request frame, the WTRU performs one or more physical measurements and sends a TPC report frame back to the AP.

44 Claims, 4 Drawing Sheets

METHOD AND APPARATUS FOR STORING MOBILE STATION PHYSICAL MEASUREMENTS AND MAC PERFORMANCE STATISTICS IN A MANAGEMENT INFORMATION BASE OF AN ACCESS POINT

CROSS REFERENCE TO RELATED APPLICATION

This application claims priority from U.S. provisional application No. 60/487,653 filed on Jul. 16, 2003, which is incorporated by reference as if fully set forth.

FIELD OF INVENTION

The present invention is related to wireless communication systems. More particularly, the present invention is related to a method and system for transferring transmit power control (TPC) information between a wireless transmit/receive unit (WTRU) and an access point (AP).

BACKGROUND

Wireless local area networks (WLANs) have become more popular because of their convenience and flexibility. As new applications for such networks are being developed, their popularity is expected to significantly increase.

Institute of Electrical and Electronics Engineers (IEEE) working groups have defined an IEEE 802.11 baseline standard having extensions which are intended to provide higher data rates arid other network capabilities. Under the IEEE 802.11 standards, network entities include a management information base (MIB). The MIB may be either a media access control (MAC) layer MIB or a physical (PHY) layer MIB. Data entries in a MIB table use IEEE 802.11 standards.

Network management entities (NMEs), connected to a WLAN, communicate with each other by sending frames. There are three types of MAC frames defined by the 802.11 standards: 1) data frames; 2) control frames; and 3) management frames. There are also sub-types for each of these frames. For example, an action frame is a sub-type of a management frame. Action frames are further defined by categories. Currently, action frame categories are defined as follows: 0—spectrum management; 1—quality of service management; 2—direct link protocol; and 3—radio measurement.

A service primitive is an internal signaling message used for inter-layer or inter-protocol entity exchanges, such as between a station management entity (SME) and a MAC layer management entity (MLME), with standardized message contents. Although a particular format of message is not specified by the standards, the standards do specify the content. Service primitives are typically used to initiate, confirm or report a particular action, such as by sending a particular frame for management purposes from one WTRU to another WTRU.

In accordance with IEEE 802.11 standards, an SME is incorporated into the WTRU in order to provide correct MAC operation. The SME is a layer-independent entity that may be viewed as residing in a separate management plane or as residing "off to the side." Thus, the SME may be viewed as being responsible for such functions as the gathering of layer-dependent status from the various layer management entities, and similarly setting the value of layer-specific parameters. The SME typically performs such functions on behalf of general system management entities and implements standard management protocols.

Furthermore, according to IEEE 802.11 standards, a WTRU contains configuration settings in the MIB that control its behavior. It is important for an AP to be able to understand the configuration of each WTRU in order to interpret the WTRU's behavior and to improve performance in the context of WLAN radio resource management (RRM). For example, a WTRU keeps track, in its MIB, of successfully received but not decodable data frames. This is important information for an AP to provide a minimum level of quality of service to the WTRU.

RRM is one of the most important aspects in WLAN management. A WLAN can achieve significant performance enhancement by performing RRM, including in-band interference mitigation and frequency re-use. For efficient RRM, it is necessary for an NME to retrieve WTRU specific TPC related information. A problem with the MIB data structure used in conventional wireless systems is that TPC information of a WTRU is not stored in the MIB of an AP.

Interference mitigation is a classic technique used in wireless communication systems to avoid interfering with other users in the vicinity by minimizing the amount of transmission power. The IEEE 802.11h standard defines messaging of a maximum allowable transmit power by means of BEACON and PROBE RESPONSE frames, and messaging by means of TPC REQUEST and TPC REPORT frames to get the instantaneous transmit power and link margin. An AP broadcasts a BEACON frame, or replies with a PROBE RESPONSE frame. A BEACON frame contains a country field, a power constraint field, a transmit power field, and a link margin field. The country field contains the maximum regulatory power level. The power constraint field contains an offset value compared to the maximum regulatory power level. The transmit power field indicates the transmit power used to transmit the TPC REPORT frame. The link margin field is set to zero in the BEACON and PROBE RESPONSE frames.

The request/report messaging and retrieving of a WTRU's physical measurement data or MAC performance statistics, such as transmit/receive power levels and link margins in a basic service set (BSS), are key parameters for supporting interference mitigation and RRM. However, these physical measurements or MAC performance statistics are not passed from an L1 PHY or L2 MAC protocol entity to the SME, which serves as an interface to an external WLAN RRM entity. The SME typically contains interface software to read/write into the MIBs. For example, upon receiving a command from a simple network management protocol (SNMP), a read of a particular MIB entry is reported back to the SNMP.

Currently, WLANs usually transmit at a much higher power level than needed. With TPC, the transmit power can be adjusted to the minimum level to still guarantee satisfactory signal reception while not creating more interference than needed interference to other WTRUs. It is also possible to perform effective load control and BSS range adjustments. Range adjustments, load balancing, and a maximum cell radius are determined by the transmit power of the AP and the receiver sensitivity of the WTRU. If transmit power is not properly controlled, WTRUs at the edge of the cell lose connection to the AP and will be forced to re-associate to neighboring APs. Therefore, proper power control enables effective load control and range adjustments.

SUMMARY

The present invention is a method and wireless communication system for transferring TPC information between a WTRU and an AP. The AP includes a first management entity and a second management entity. The WTRU including a third management entity. The first management entity in the AP determines whether or not to adapt the transmit power level of the WTRU. The first management entity transmits a first message requesting TPC information to the second management entity in the AP if the first management entity determines to adapt the transmit power level of the WTRU. The second management entity may transmit a message to the first management entity confirming receipt of the first message.

The second management entity in the AP transmits a second message to the WTRU requesting that the WTRU provide TPC information to the AP. In response to the WTRU receiving the second message, the third management entity in the WTRU performs one or more physical measurements to determine one or more TPC parameters. The third management entity then transmits a third message including the requested TPC information associated with results of the physical measurements to the AP.

The measurements performed by the third management entity may include a WTRU transmit power level measurement, a link margin measurement, a clear channel assessment (CCA), a perceived signal-to-noise indication (PSNI) measurement, a received signal strength indication (RSSI) measurement, and a received channel power indication (RCPI) measurement. The first management entity may be an SME and the second and third management entities may be MLMEs. The wireless communication system may be a WLAN.

BRIEF DESCRIPTION OF THE DRAWING(S)

A more detailed understanding of the invention may be had from the following description of a preferred example, given by way of example and to be understood in conjunction with the accompanying drawing wherein.

DETAILED DESCRIPTION OF THE PREFERRED EMBODIMENT(S)

Figure 1A:
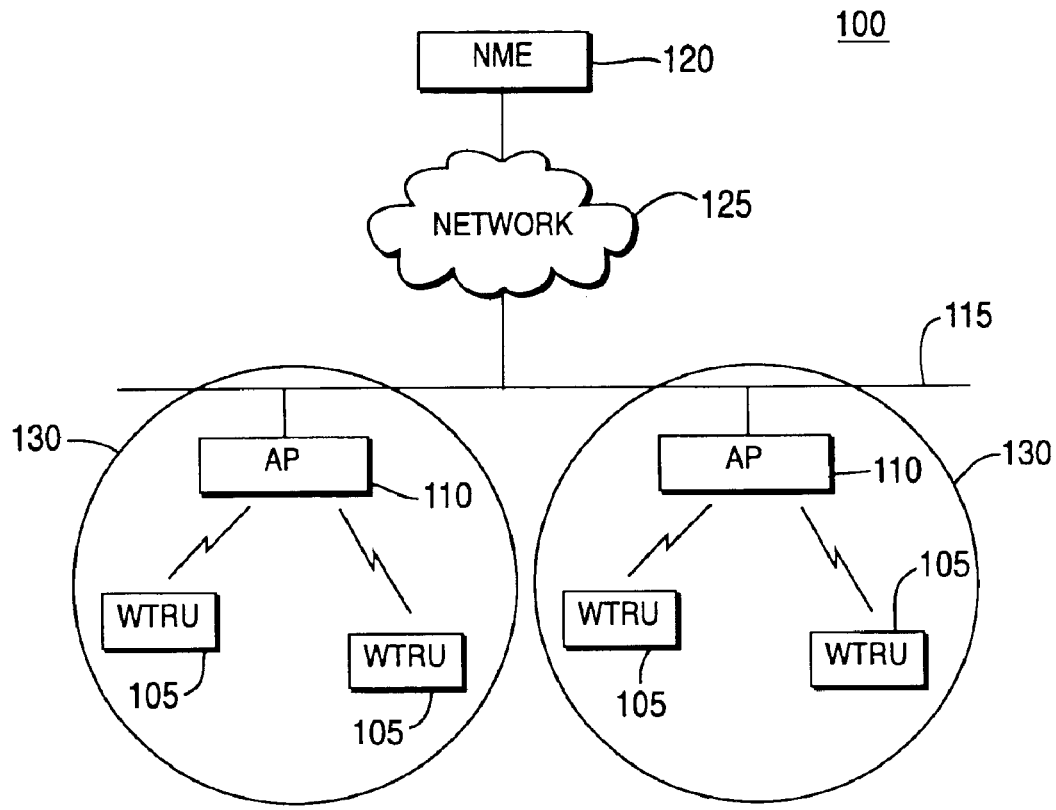
FIG. 1A is a block diagram of a wireless communication system operating in accordance with the present invention.

Hereafter, a WTRU includes but is not limited to a user equipment, a mobile station, a fixed or mobile subscriber unit, a pager, or any other type of device capable of operating in a wireless environment. When referred to hereafter, an AP includes but is not limited to a base station, a Node-B, a site controller, or any other type of interfacing device in a wireless environment.

The present invention will be described with reference to the drawing figures wherein like numerals represent like elements throughout. The present invention applies as add-on to the WLAN IEEE 802.11 standards (802.11 baseline, 802.11a, 802.11b, and 802.11g), and also applies to IEEE 802.11e, 802.11h and 802.16.

The present invention may be further applicable to Time Division Duplex (TDD), Frequency Division Duplex (FDD), and Time Division Synchronous CDMA (TDSCDMA), as applied to a Universal Mobile Telecommunications System (UMTS), CDMA 2000 and CDMA in general, but is envisaged to be applicable to other wireless systems as well.

The features of the present invention may be incorporated into an integrated circuit (IC) or be configured in a circuit comprising a multitude of interconnecting components.

FIG. 1A is a block diagram of a wireless communication system 100 including a plurality of WTRUs 105, a plurality of APs 110, a distribution system (DS) 115, an NME 120 and a network 125. The WTRUs 105 and APs 110 form respective base service sets (BSSs) 130. The BSSs 130 and the DS 115 form an extended service set (ESS). The APs 110 are connected to the NME 120 through the network 125. The wireless communication system 100 may be a WLAN.

Figure 1B:
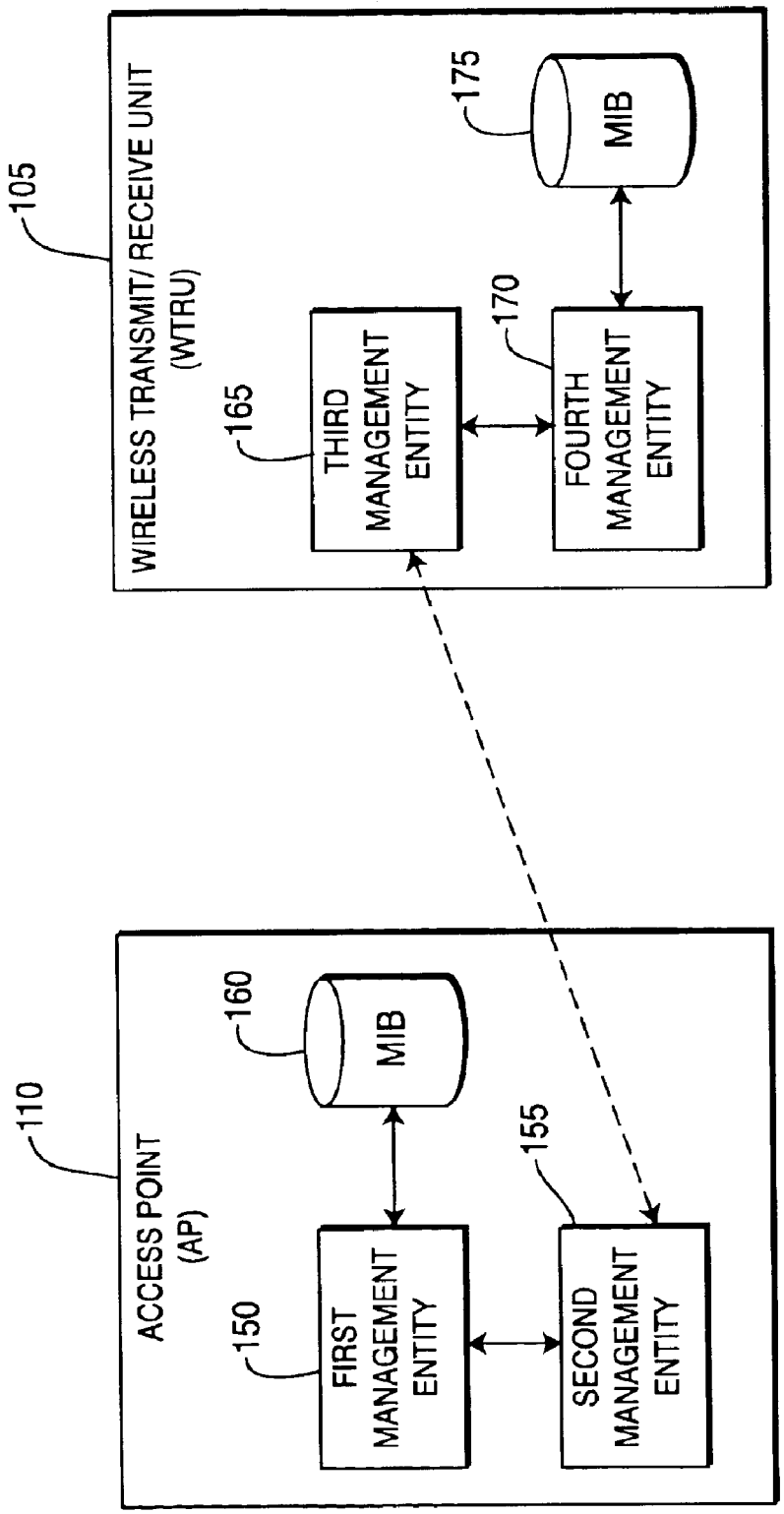
FIG. 1B is a detailed block diagram illustrating the configuration of an AP and WTRU used in the wireless communication system of FIG. 1A.

FIG. 1B is a detailed block diagram illustrating the configuration of the APs 110 and WTRUs 105 used in the wireless communication system 100. The AP 110 includes a first management entity 150, a second management entity 155 and a first MIB 160. The WTRU 105 includes a third management entity 165, a fourth management entity 170 and a second MIB 175. The MIBs 160 and 175 consist of one or more storage devices (e.g., a counter, a register or other memory device) used to store configuration parameters, performance metrics and fault indicators.

The first management entity 150 may be an SME. The second management entity 155 may be an MLME. The third management entity 165 may be an MLME. The fourth management entity 170 may be an SME.

Referring to FIG. 1A, an RRM controller (not shown) residing in the NME 120 communicates with the APs 110 via the network 125 and DS 115. The APs 110 wirelessly communicate with the WTRUs 105. The NME 120 sends a message to the APs 110 to change admissible power levels in the AP's BSS by means of higher layer (layer 2 or higher) management protocols, such as SNMP or Extensible Markup Language (XML). The NME 120 writes allowable maximum and minimum values into the MIB 160 of the AP 110.

A process is implemented in the AP 110 that regularly reads the entries in the MIB 160 of the AP 110 and uses service primitives to send and receive MAC signaling frames. The MAC signaling frames, such as BEACON or TPC REQUEST, MEASUREMENT REQUEST or the like, communicate to all of the WTRUs 105 in the cell.

When the AP 110 receives MAC signaling frames from the WTRUs 105 (e.g., TPC REPORTS, MEASUREMENT REPORTS, or the like), the AP 110 takes the reported measurements and uses service primitives to write the performance measurements in the MIB 160 of the AP 110. The NME 120 then reads these MIB entries in the APs 110 via the management protocols to learn the current system performance. The NME 120 controls the transmit power level of the WTRUs 105.

The MIB may be either MAC MIB or PHY MIB. MAC MIB is generally preferred because most RRM units operate at the MAC level, which has a very fast response. Entries in the MIB table shall be included either in a per-WTRU table, which is preferred, or in a global statistics table. By making these physical measurement data available to external entities by storing them in the MIB of the AP 110, it is possible to keep interference levels low, resulting in higher system capacity.

Figure 2:
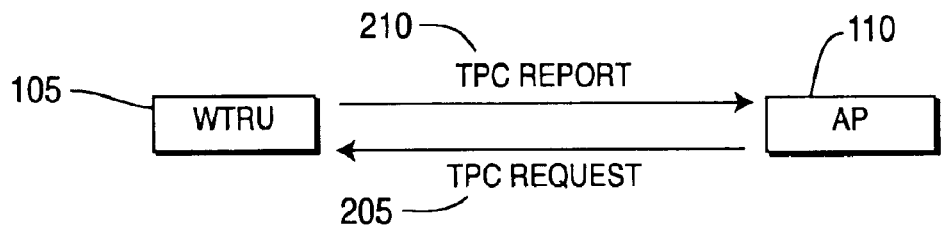
FIG. 2 is a signal flow diagram showing communication between a WTRU and an AP for obtaining TPC information in accordance with the present invention.

FIG. 2 illustrates a process which supports communication between a WTRU 105 and an AP 110 in order to obtain TPC data in accordance with the present invention. Once an AP 110 decides to obtain TPC data from a target WTRU 105, the AP 110 transmits a TPC request frame 205 to the target WTRU 105. In response to the TPC request frame 205, the WTRU 105 performs one or more requested physical measurements and transmits a TPC report frame 210 to the AP 110. The AP 110 then stores the TPC data in the MIB 160 of the AP 110 which is made available to external entities, such as an NME 120.

Referring to FIGS. 1A and 1B, the process to obtain TPC data can also be initiated by the NME 120, which in turn triggers the first management entity 150 in the AP 110 to send a primitive to the second management entity 155 to send a MAC signaling frame to the WTRU 105 and so on.

Figure 3:
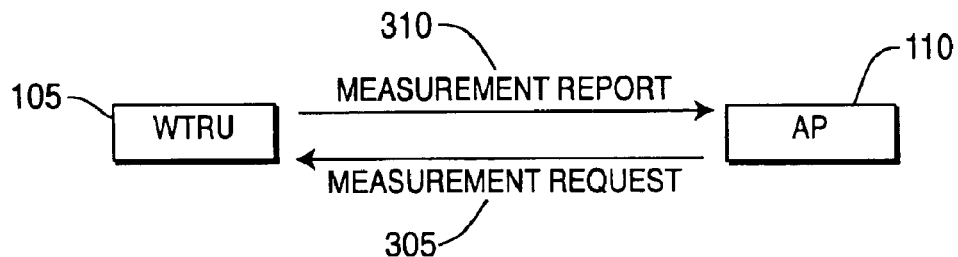
FIG. 3 is a signal flow diagram showing communication between a WTRU and an AP for requesting and receiving a measurement report in accordance with the present invention.

FIG. 3 illustrates a process which supports communication between a WTRU 105 and an AP 110 in order for the AP 110 to request a WTRU 105 to perform one or more measurements and report specific physical parameters of the WTRU 105 to the AP 110. Once an AP 110 decides to request physical measurement data from a WTRU 105, the AP 110 transmits a measurement request frame 305 to a target WTRU 105 for measuring and reporting certain physical parameters of the target WTRU 105. The measurements may include transmit power, link margin, a CCA report, received power indicator (RPI) histogram report, or any other physical related measurements. These may be absolute values, statistical averages or histogram values, or values that are calculated utilizing any type of algorithm or optimization routine. After performing the requested measurement, the target WTRU 105 compiles measurement data and transmits a measurement report frame 310 to the AP 110. The measurement data is stored in the MIB 160 of the AP 110 and, optionally, at the MIB 175 of the WTRU 105.

The MIB 175 in the WTRU 105 stores two different categories of information. The first category includes a variety of physical measurements such as signal power, interference levels, noise histograms, or the like. The second category is a variety of MAC performance statistics such as CCA busy fractions, average back-off times, erroneous frame counters, or the like.

When the received physical measurement and MAC performance statistics are stored in the MIB 160 of the AP 110, it is made available to an entity which is responsible for RRM. The MIB 160 may be either a MAC MIB or a PHY MIB. A MAC MIB is preferred because RRM messaging is also performed in MAC layer, and it is much faster than PHY layer. These physical measurement data are made available to external entities by storing them in the MIB 160 of the AP 110. Thus, effective load control and BSS range adjustments become possible.

Figure 4:
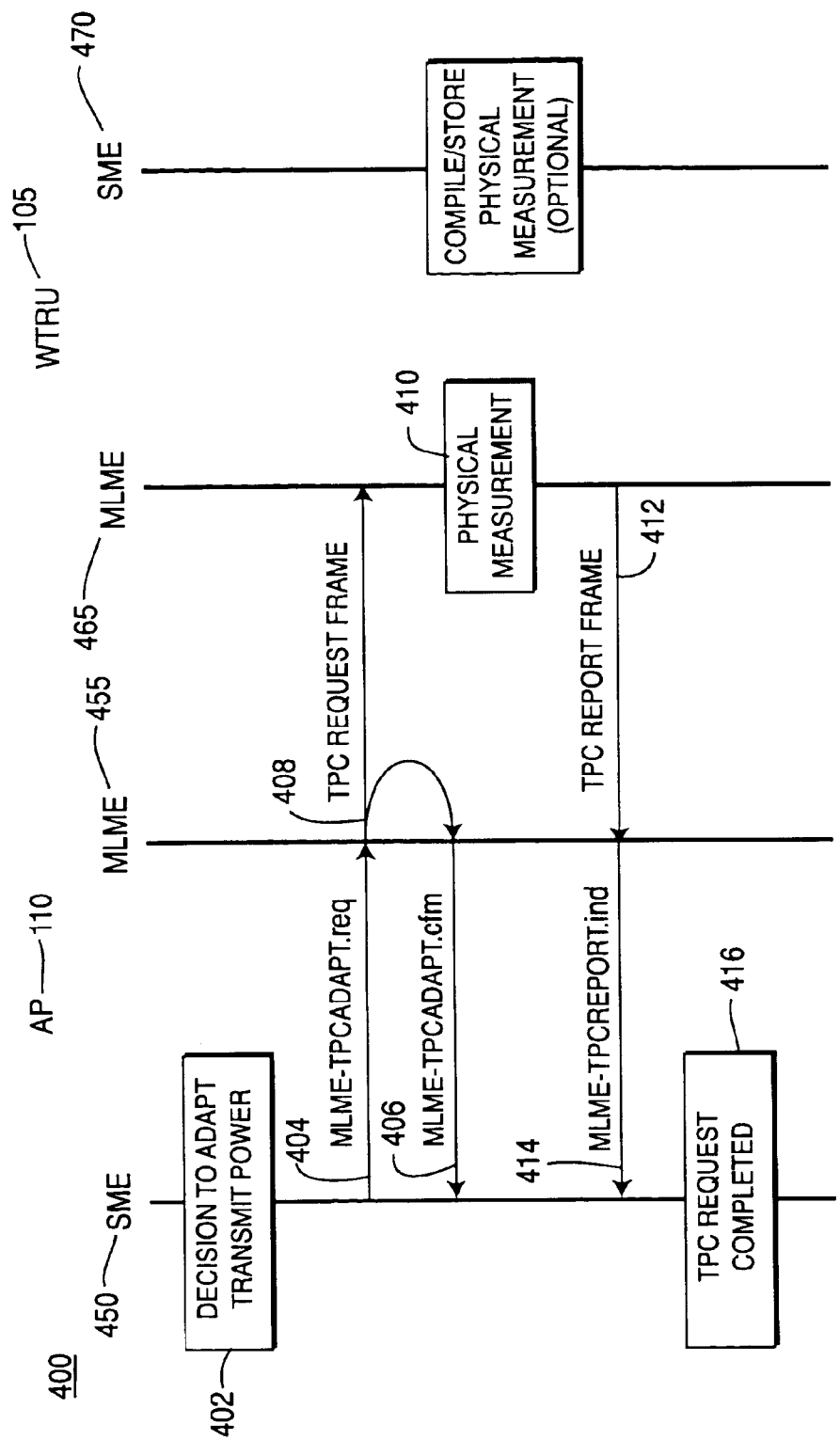
FIG. 4 is a signal flow diagram illustrating an exemplary process for transferring TPC information using service primitives between network management entities in accordance with the present invention.

FIG. 4 is a signal flow diagram illustrating an exemplary process 400 for obtaining TPC information using service primitives between an AP 110 and a WTRU 105. Internal messaging is performed with service primitives newly introduced by the present invention. Using process 400, an AP 110 may obtain TPC data from the WTRU 105 and store the TPC data in the MIB 160 of the AP 110.

The AP 110 includes an SME 450 and an MLME 455. The WTRU 105 includes a MLME 465 and an SME 470.

Referring to FIG. 4, the SME 450 of the AP 110 determines whether or not to adapt transmit power level of the WTRU 105 (step 402). In step 404, the SME 450 transmits a first message (MLME-TPCADAPT.req) to the MLME 455 of the AP 110 requesting TPC information if the SME 450 determines in step 402 to adapt the transmit power level of the WTRU 105. In step 406, the MLME 455 transmits a second message (MLME-TPCADAPT.cfm) to the SME 450 confirming receipt of the first message (MLME-TPCADAPT.req). In step 408, the MLME 455 transmits a third message (TPC request frame) to the target WTRU 105 requesting TPC information, and the MLME 465 of the target WTRU 105 receives the third message (TPC request frame). In step 410, the MLME 465 performs one or more physical measurements to determine TPC parameters such as WTRU transmit power level, WTRU receive power level, link margin (i.e., transmit power minus receive power), PSNI, RSSI, RCPI, or the like. The results of the measurements to determine TPC parameters may be forwarded to the SME 470 and stored in the MIB 175 of the WTRU 105. In step 412, the MLME 465 of the target WTRU 105 transmits a fourth signal (TPC report frame) including the requested TPC information to the AP 110. In step 414, the MLME 465 transmits a fifth message (MLME-TPCREPORT.ind) including the requested TPC information to the SME 450. The SME 450 may store the requested TPC information in the MIB 160 of the AP 110, such that the TPC information is available to external RRM entities. The TPC request is completed in step 416.

Figure 5:
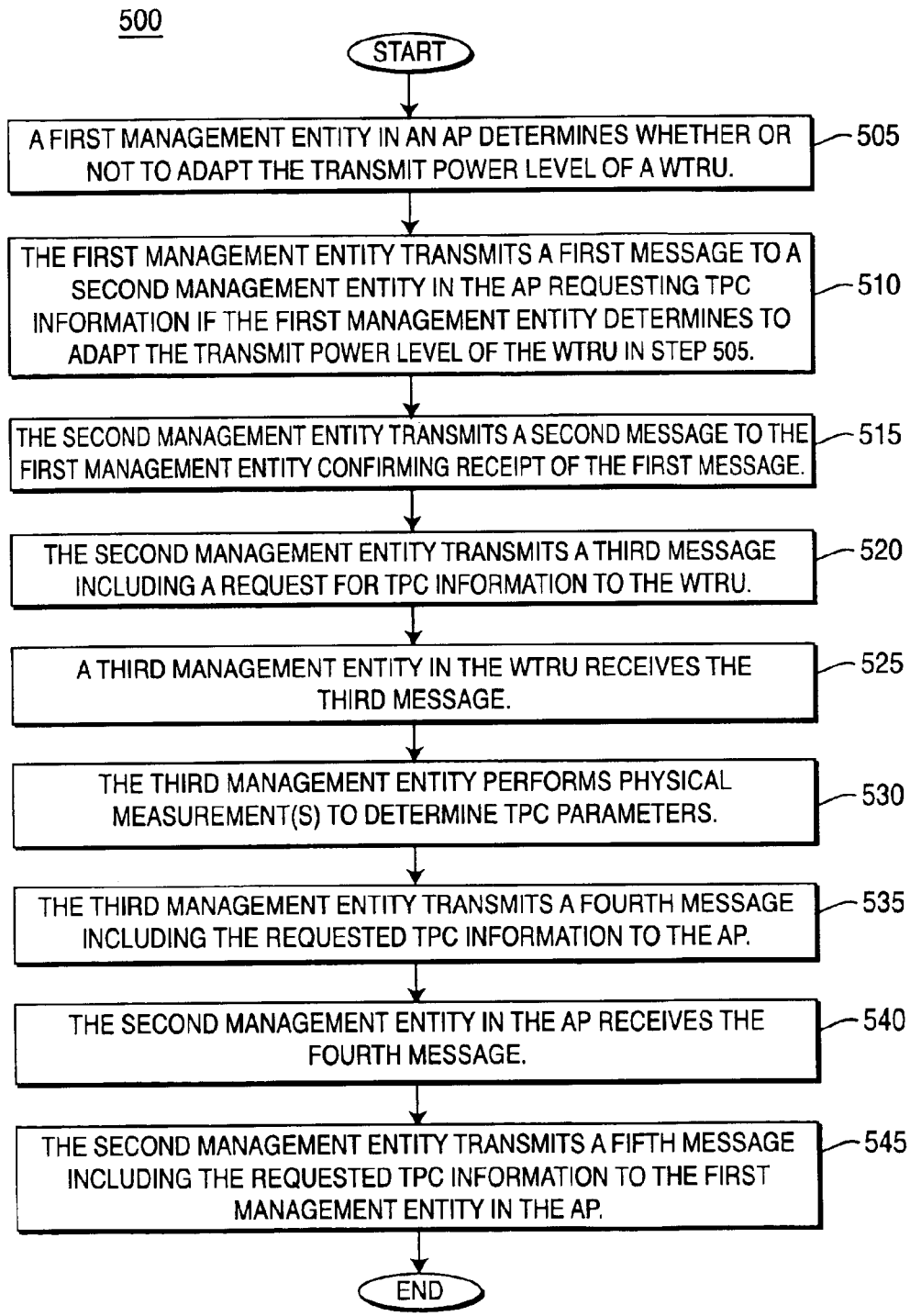
FIG. 5 is a flowchart of an exemplary process including method steps for transferring TPC information between network entities in accordance with the present invention.

FIG. 5 is a flowchart of an exemplary process 500 including method steps for transferring TPC information between network entities in accordance with the present invention.

As shown in FIG. 1A, process 500 is implemented in a wireless communication system 100 including at least one AP 110 and at least WTRU 105. As shown in FIG. 1B, the AP 110 includes a first management entity 150 and a second management entity 155. Furthermore, as shown in FIG. 1B, the WTRU 105 includes a third management entity 165 and a fourth management entity 170.

Referring to FIG. 5, the first management entity 150 in an AP 110 determines whether or not to adapt the transmit power level of the WTRU 105 (step 505). In step 510, the first management entity 150 transmits a first message to the second management entity 155 in the AP 110 requesting TPC information if the first management entity 150 determines to adapt the transmit power level of the WTRU 105 in step 505. In step 515, the second management entity 155 transmits a second message to the first management entity 150 confirming receipt of the first message. In step 520, the second management entity 155 transmits a third message including a request for TPC information to the WTRU 105. In step 525, the third management entity 165 in the WTRU 105 receives the third message. In step 530, the third management entity 165 performs one or more physical measurements to determine TPC parameters. The third management entity 165 may transfer the results of the physical measurements to the fourth management entity 170, which in turn may store the results of the physical measurements in the MIB 175. In step 535, the third management entity 165 transmits a fourth message including the requested TPC information to the AP 110. In step 540, the second management entity 155 in the AP 110 receives the fourth message. In step 545, the second management entity 155 transmits a fifth message including the requested TPC information to the first management entity. The requested TPC information may then be stored in the MIB 160 of the AP 110.

While this invention has been particularly shown and described with reference to preferred embodiments, it will be understood by those skilled in the art that various changes in form and details may be made therein without departing from the scope of the invention described hereinabove.

What is claimed is:

1. In a wireless communication system including at least one access point (AP), at least one network management entity (NME) and at least one wireless transmit/receive unit (WTRU), the AP including a first management entity, a management information base (MIB) and a second management entity, a method of making physical parameter measurement data of the WTRU accessible to the NME, the method comprising:
   (a) the first management entity transmitting a first message to the second management entity in the AP instructing the second management entity to send a request to the WTRU to measure and report at least one specific physical parameter;
   (b) in response to receiving the first message, the second management entity in the AP transmitting a second message to the WTRU requesting that the WTRU measure and report the at least one specific physical parameter to the AP;
   (c) in response to the WTRU receiving the second message, the WTRU measuring the at least one specific physical parameter;
   (d) the WTRU transmitting a third message including data associated with the at least one specific physical parameter measurement to the AP; and
   (e) the first management entity storing the specific physical parameter measurement data in the MIB such that the data is available to the at least one NME.

2. The method of claim 1 wherein the first management entity is a station management entity (SME).

3. The method of claim 1 wherein the second management entity is a media access control (MAC) layer management entity (MLME).

4. The method of claim 1 wherein the WTRU comprises a media access control (MAC) layer management entity (MLME).

5. The method of claim 1 further comprising:
   (e) the second management entity transmitting a message to the first management entity confirming receipt of the first message.

6. The method of claim 1 wherein the wireless communication system is a wireless local area network (WLAN).

7. The method of claim 1 wherein the specific physical parameter measurement data indicates the transmit power level of the WTRU.

8. The method of claim 1 wherein the specific physical parameter measurement data indicates link margin of the WTRU.

9. The method of claim 1 wherein the specific physical parameter measurement data indicates clear channel assessment (CCA) of the WTRU.

10. The method of claim 1 wherein the specific physical parameter measurement data indicates perceived signal-to-noise indication (PSNI) of the WTRU.

11. The method of claim 1 wherein the specific physical parameter measurement data indicates received signal strength indication (RSSI) of the WTRU.

12. The method of claim 1 wherein the specific physical parameter measurement data indicates received channel power indication (RCPI) of the WTRU.

13. A wireless communication system comprising:
   (a) at least one access point (AP) including a first management entity, a management information base (MIB) and a second management entity;
   (b) at least one network management entity (NME); and
   (c) at least one wireless transmit/receive unit (WTRU), wherein:
      (i) the first management entity transmits a first message to the second management entity in the AP instructing the second management entity to send a request to the WTRU to measure and report at least one specific physical parameter;
      (ii) in response to receiving the first message, the second management entity in the AP transmits a second message to the WTRU requesting that the WTRU measure and report the at least one specific physical parameter to the AP;
      (iii) in response to the WTRU receiving the second message, the WTRU measures the at least one specific physical parameter;
      (iv) the WTRU transmits a third message including data associated with the at least one specific physical parameter measurement to the AP; and
      (v) the first management entity stores the at least one specific physical parameter measurement data in the MIB such that the data is available to the at least one NME.

14. The system of claim 13 wherein the first management entity is a station management entity (SME).

15. The system of claim 13 wherein the second management entity is a media access control (MAC) layer management entity (MLME).

16. The system of claim 13 wherein the WTRU comprises a media access control (MAC) layer management entity (MLME).

17. The system of claim 13 wherein the second management entity further transmits a message to the first management entity confirming receipt of the first message.

18. The system of claim 13 wherein the wireless communication system is a wireless local area network (WLAN).

19. The system of claim 13 wherein the specific physical parameter measurement data indicates the transmit power level of the WTRU.

20. The system of claim 13 wherein the specific physical parameter measurement data indicates link margin of the WTRU.

21. The system of claim 13 wherein the specific physical parameter measurement data indicates clear channel assessment (CCA) of the WTRU.

22. The system of claim 13 wherein the specific physical parameter measurement data indicates perceived signal-to-noise indication (PSNI) of the WTRU.

23. The system of claim 13 wherein the specific physical parameter measurement data indicates received signal strength indication (RSSI) of the WTRU.

24. The system of claim 13 wherein the specific physical parameter measurement data indicates received channel power indication (RCPI) of the WTRU.

25. An access point (AP) for requesting transmit power control (TPC) information from a wireless transmit/receive unit (WTRU), the AP comprising:
   (a) a first management entity;
   (b) a second management entity; and
   (c) a management information base (MIB) in communication with the first management entity, wherein the first management entity is configured to:

(i) transmit a first message to the second management entity if the first management entity determines to adapt the transmit power level of the WTRU, the first message requesting TPC information; and the second management entity is configured to:
(ii) transmit a second message to the WTRU requesting that the WTRU provide the requested TPC information to the AP by performing one or more physical measurements to determine one or more TPC parameters; and
(iii) receive a third message including the requested TPC information associated with results of the physical measurements; and the MIB is configured to store the requested TPC information such that the requested TPC information is accessible to at least one network management entity (NME).

26. The AP of claim 25 wherein the first management entity is a station management entity (SME).

27. The AP of claim 25 wherein the second management entity is a media access control (MAC) layer management entity (MLME).

28. The AP of claim 25 wherein the second management entity is further configured to transmit a message to the first management entity confirming receipt of the first message.

29. The AP of claim 25 wherein the measurements include a WTRU transmit power level measurement.

30. The AP of claim 25 wherein the measurements include a link margin measurement.

31. The AP of claim 25 wherein the measurements include a clear channel assessment (CCA).

32. The AP of claim 25 wherein the measurements include a perceived signal-to-noise indication (PSNI) measurement.

33. The AP of claim 25 wherein the measurements include a received signal strength indication (RSSI) measurement.

34. The AP of claim 25 wherein the measurements include a received channel power indication (RCPI) measurement.

35. An integrated circuit (IC) for requesting transmit power control (TPC) information from a wireless transmit/receive unit (WTRU), the IC comprising:
(a) a first management entity;
(b) a second management entity; and
(c) a management information base (MIB) in communication with the first management entity, wherein the first management entity is configured to:
(i) transmit a first message to the second management entity if the first management entity determines to adapt the transmit power level of the WTRU, the first message requesting TPC information; and the second management entity is configured to:
(ii) transmit a second message to the WTRU requesting that the WTRU provides the requested TPC information to the IC by performing one or more physical measurements to determine one or more TPC parameters; and
(iii) receive a third message including the requested TPC information associated with results of the physical measurements; and the MIB is configured to store the requested TPC information such that the requested TPC information is accessible to at least one network management entity (NME).

36. The IC of claim 35 wherein the first management entity is a station management entity (SME).

37. The IC of claim 35 wherein the second management entity is a media access control (MAC) layer management entity (MLME).

38. The IC of claim 35 wherein the second management entity is further configured to transmit a message to the first management entity confirming receipt of the first message.

39. The IC of claim 35 wherein the measurements include a WTRU transmit power level measurement.

40. The IC of claim 35 wherein the measurements include a link margin measurement.

41. The IC of claim 35 wherein the measurements include a clear channel assessment (CCA).

42. The IC of claim 35 wherein the measurements include a perceived signal-to-noise indication (PSNI) measurement.

43. The IC of claim 35 wherein the measurements include a received signal strength indication (RSSI) measurement.

44. The IC of claim 35 wherein the measurements include a received channel power indication (RCPI) measurement.

* * * * *

UNITED STATES PATENT AND TRADEMARK OFFICE
CERTIFICATE OF CORRECTION

| | | |
|---|---|---|
| PATENT NO. | : 6,958,982 B2 | Page 1 of 1 |
| APPLICATION NO. | : 10/890790 | |
| DATED | : October 25, 2005 | |
| INVENTOR(S) | : Rudolf et al. | |

It is certified that error appears in the above-identified patent and that said Letters Patent is hereby corrected as shown below:

IN THE SPECIFICATION

At column 2, line 55, after the word "needed", delete "interference".

At column 5, line 67, after the word "includes", delete "a" and insert therefor --an--.

At column 6, line 36, after the word "least", insert --one--.

Signed and Sealed this

Twenty-second Day of May, 2007

JON W. DUDAS
*Director of the United States Patent and Trademark Office*

UNITED STATES PATENT AND TRADEMARK OFFICE
CERTIFICATE OF CORRECTION

PATENT NO.           : 6,958,982 B2                                             Page 1 of 1
APPLICATION NO. : 10/890790
DATED                    : October 25, 2005
INVENTOR(S)          : Rudolf et al.

It is certified that error appears in the above-identified patent and that said Letters Patent is hereby corrected as shown below:

IN THE SPECIFICATION

At column 2, line 55, after the word "needed", delete "interference".

At column 5, line 67, after the word "includes", delete "a" and insert therefor --an--.

At column 6, line 36, after the word "least", insert --one--.

Signed and Sealed this

Fifth Day of June, 2007

JON W. DUDAS
*Director of the United States Patent and Trademark Office*